(12) United States Patent
Full (10) Patent No.: US 11,779,162 B1
(45) Date of Patent: Oct. 10, 2023

(54) BLENDER WITH INTEGRAL FOOD RESIDUE SCRAPER

(71) Applicant: James Full, Staten Island, NY (US)

(72) Inventor: James Full, Staten Island, NY (US)

( * ) Notice: Subject to any disclaimer, the term of this patent is extended or adjusted under 35 U.S.C. 154(b) by 489 days.

(21) Appl. No.: 16/998,712

(22) Filed: Aug. 20, 2020

Related U.S. Application Data (60) Provisional application No. 62/890,099, filed on Aug. 22, 2019.

(51) Int. Cl.
| | |
|---|---|
| *A47J 43/07* | (2006.01) |
| *A47J 43/046* | (2006.01) |
| *A47J 43/28* | (2006.01) |
| *B01F 27/90* | (2022.01) |
| *B01F 35/12* | (2022.01) |
| *B01F 101/06* | (2022.01) |

(52) U.S. Cl.
CPC ......... *A47J 43/0722* (2013.01); *A47J 43/046* (2013.01); *A47J 43/288* (2013.01); *B01F 27/90* (2022.01); *B01F 35/123* (2022.01); *B01F 2101/06* (2022.01)

(58) Field of Classification Search
CPC .... A47J 43/0722; A47J 43/046; A47J 43/288; B01F 27/90; B01F 35/123; B01F 2101/06
USPC .......................... 366/120, 242, 260; 100/112
See application file for complete search history.

(56) References Cited

U.S. PATENT DOCUMENTS

| | | | |
|---|---|---|---|
| 3,373,975 A | | 3/1968 | Congdon |
| 3,417,972 A | * | 12/1968 | Conway ................. B01F 35/45 |
| | | | 241/199.12 |
| 3,504,391 A | | 4/1970 | McCarty |
| 5,547,279 A | | 8/1996 | Spitzer, Sr. |
| 5,890,804 A | | 4/1999 | Edwards |
| 9,084,513 B2 | | 7/2015 | Simons |
| 9,480,279 B2 | | 11/2016 | Fogelin |
| 9,656,227 B2 | | 5/2017 | Paget |
| 9,770,133 B2 | | 9/2017 | Dickson, Jr. |
| 9,808,948 B2 | | 11/2017 | Fischer |
| 9,883,773 B1 | | 2/2018 | Zuber |
| 2012/0008455 A1 | * | 1/2012 | Sand .................. B01F 35/3203 |
| | | | 366/130 |
| 2012/0294108 A1 | * | 11/2012 | Dickson, Jr. .......... B01F 27/808 |
| | | | 366/205 |

(Continued)

FOREIGN PATENT DOCUMENTS

| | | | | |
|---|---|---|---|---|
| CN | 108209623 A | * | 6/2018 | |
| FR | 1478857 A | * | 5/1966 | |

*Primary Examiner* — Katrina M Stransky
*Assistant Examiner* — P Derek Pressley
(74) *Attorney, Agent, or Firm* — Goldstein Law Offices, P.C.

(57) ABSTRACT

A blender adapted to reduce food pieces and produce a blended food mixture, comprising a blending container for holding the food pieces, a pedestal having a motorized blade for reducing the food pieces, and a food scraping assembly positioned within the blending container. The food scraping assembly has a scraping ring adapted to dislodge unblended food particles adhering to an inner surface of the blending container, a rod adapted to alternatively raise and lower the scraping ring within the blending container, and an air pocket puncturing projection adapted to collapse a cavitation air bubble which surrounds the blade and interferes with the production of the blended food mixture.

8 Claims, 8 Drawing Sheets

(56) References Cited

U.S. PATENT DOCUMENTS

| | | | |
|---|---|---|---|
| 2014/0241109 A1* | 8/2014 | Paget | A47J 43/0465 366/205 |
| 2015/0157049 A1* | 6/2015 | Fogelin | B01D 33/015 210/396 |
| 2016/0045073 A1* | 2/2016 | Kozlowski | A47J 43/046 366/182.1 |

* cited by examiner

BLENDER WITH INTEGRAL FOOD RESIDUE SCRAPER

CROSS REFERENCES AND RELATED SUBJECT MATTER

This application is a non-provisional filing of provisional patent application Ser. No. 62/890,099, filed in the United States Patent Office on Aug. 22, 2019, from which priority is claimed and which is incorporated by reference herein in its entirety.

TECHNICAL FIELD

The present disclosure relates generally to a kitchen appliance for mixing, pureeing, or emulsifying food ingredients. More particularly, the present disclosure relates to a blender with an integrated food scraping assembly for clearing food residue and air pockets which interfere with the blender's operation.

BACKGROUND

Blenders are useful appliances for mechanically reducing solid pieces of food to form a mixed, pureed, or emulsified food product. Blenders typically operate by using a spinning motorized blade to reduce a piece of food within a blending container. There are two common problems inherent in the operation of conventional blenders which interfere with the production of the food product. During the blending process, unblended food particles and residue may adhere to the inner surface of the blending container, thus preventing the formation of a food product with uniform consistency. A conventional blender requires the user to cease operating the blender and manually scrape the accumulated food particles off the inner surface of the blending container with a spatula or other similar implement. The other common problem is the formation of an air pocket around the blade which prevents the blade from contacting any of the food pieces within the blending container. Air pockets typically form as a result of cavitation, particularly when the blender is used to prepare viscous foods and ingredients, such as ice cream, bananas, chickpeas, and other thick foods. When operating a conventional blender, the user must likewise cease operation of the blender, and manually collapse the air pocket using a tool or implement.

There are many examples within the prior art of devices which seek to address or mitigate these problems inherent in the operation of conventional blenders. Certain devices take the form of handheld spatulas and scrapers which are shaped to match the inner surface of the blending container. For example, the prior art contains examples of rounded spatulas or scraping devices which conform to the curvature of typical blending containers. However, these devices cannot be used unless the blender is stopped. The prior art also contains many examples of blenders with integrated wipers which rotate within the blending container to scrape off any food residue which accumulates along the inner surface of the container. However, blenders with integrated wipers do not address the problem of cavitation air pockets, and the rotational movement of the wipers fails to push the food residue towards the blades. The addition of the wipers within the blending container also allows unblended food to adhere to the wipers, thus potentially creating a need to manually remove stuck, unblended food particles from the wipers. Furthermore, rotating wipers cannot be used where the blending container is not cylindrical, but has a polygonal shape.

Therefore, a need exists for an improved blender which is capable of dislodging unblended food particles and residue from the inner surface of the blending container and directing or pushing the dislodged particles towards the blades, as well as collapsing any air pockets formed around the blades, without interrupting the operation of the blender.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a blender with integrated components capable of dislodging accumulations of food particles from the inside of a blender container. Accordingly, the present disclosure provides a blender comprising, in addition to the blending container, a pedestal having a motorized blade assembly operably to which the blending container is operably connected, and a food scraping assembly adapted to be placed within the blending container. The food scraping assembly is adapted to be raised and lowered within the food container via a rod, and has a scraping ring adapted to dislodge the accumulated food particles in both upward and downward directions.

It is another aspect of an example embodiment in the present disclosure to provide a blender with integrated components capable of collapsing an air pocket which is formed around the blade assembly by cavitation. Accordingly, the present disclosure provides a blender having an air pocket puncturing projection attached to the rod, which is adapted to puncture and collapse the air pocket around the blade assembly.

It is yet another aspect of an example embodiment in the present disclosure to provide a blender with integrated components capable of dislodging the food particles from inside the blender container without resulting the dislodged food residue building up on the scraping ring. Accordingly, the present disclosure provides a scraping ring with an upward scraping edge having a wedge-shaped upper incline, and a downward scraping edge having a lip. The wedge-shaped upper incline allows the dislodged food particles to slide off the scraping ring as the food scraping assembly is raised upwardly. When the food scraping assembly is pushed downwardly, the lip catches the dislodged food residue and channels it downwardly until the food residue falls away from the scraping ring.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
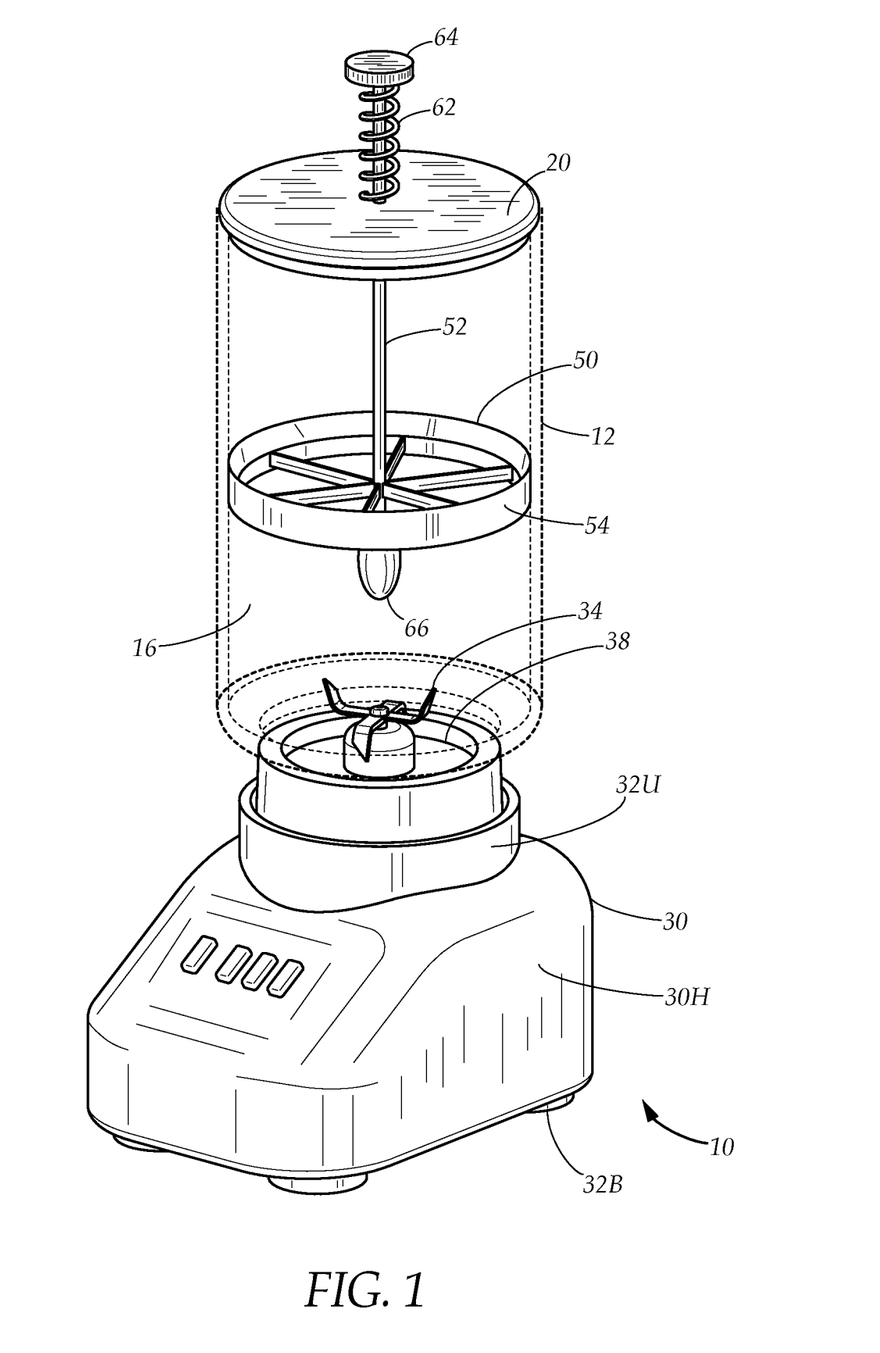
FIG. 1 is diagrammatical perspective view of a blender with a blending container, a pedestal portion with a motorized blade assembly, and a food scraping assembly located within the container, in accordance with an embodiment in the present disclosure.
Figure 4:
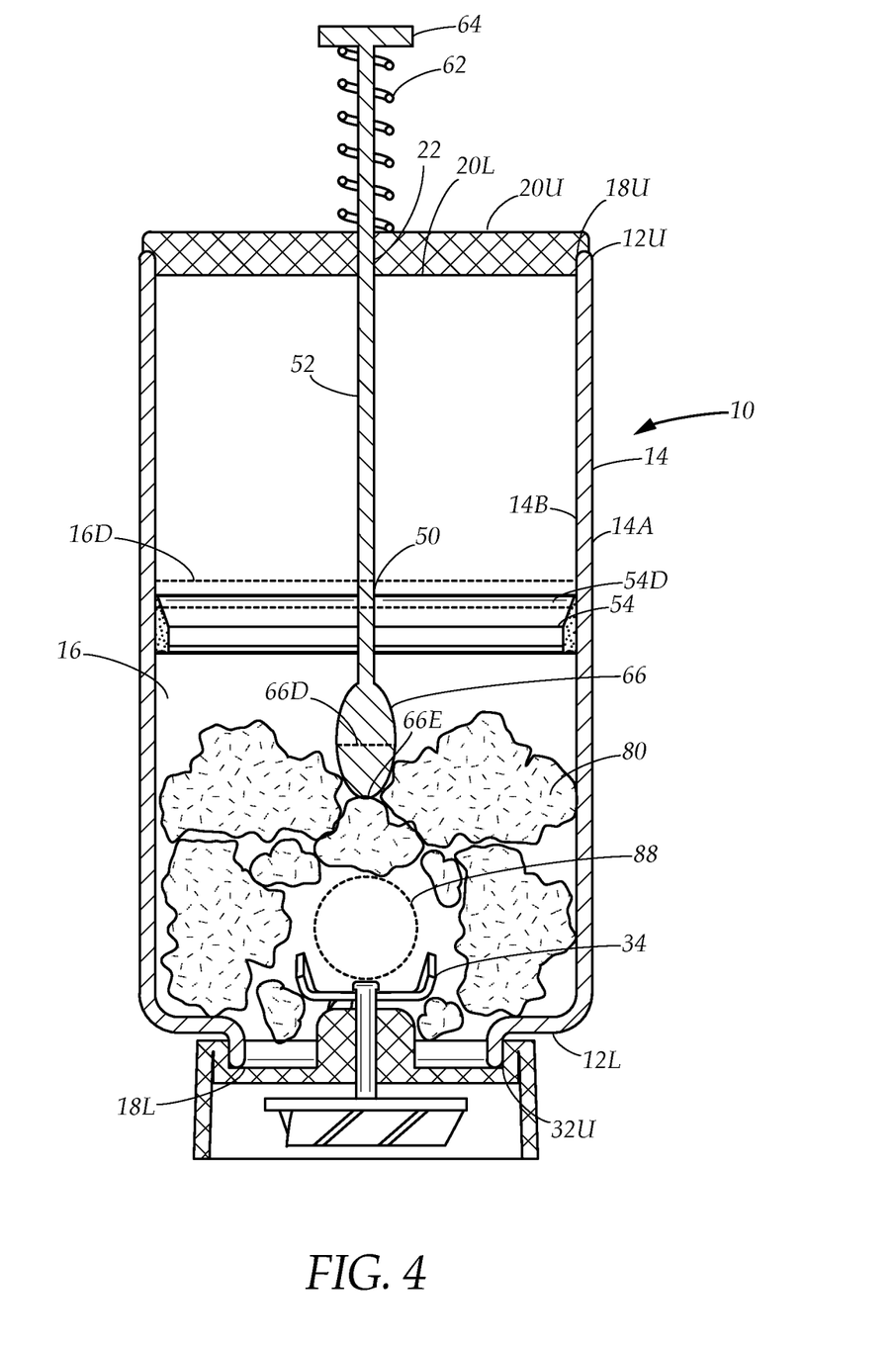
FIG. 4 is as diagrammatical cross section view of the blender showing food pieces within the blending container, and an air pocket formed around the motorized blade which prevents the food pieces from contacting the motorized blade.
Figure 6:
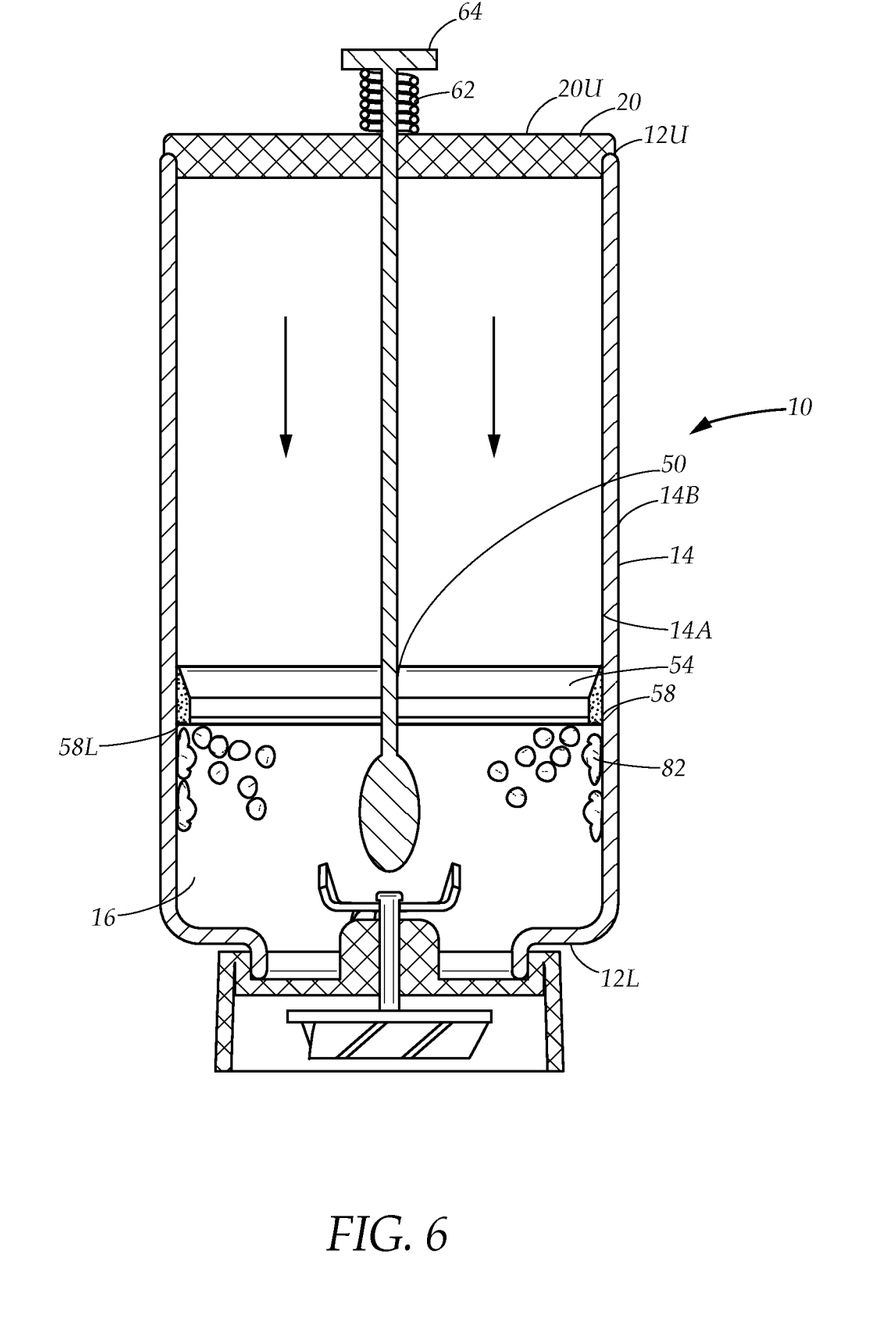
FIG. 6 is a diagrammatical cross section view of the blender, showing unblended food particles accumulating along the inner surface of the blending container below the scraping ring, further showing the food scraping assembly being pushed downwardly to allow the downward scraping edge to dislodge the unblended food particles from the inner surface, in accordance with an embodiment in the present disclosure.

FIG. 1 illustrates a blender 10 comprising a blending container 12, a pedestal portion 30 to which the blending container 12 is operably attached, and a food scraping assembly 50 held within the blending container 12. Referring briefly to FIG. 4 and FIG. 6 while continuing to refer to FIG. 1, the food scraping assembly 50 is adapted to improve the performance of the blender 10 by puncturing an air pocket 88 which forms within the blending container 12, and removing unblended food particles 82 and other residue which adhere to the blending container 12.

Turning to FIG. 4 and FIG. 6 while continuing to refer to FIG. 1, the blending container 12 is substantially hollow, and has a container upper portion 12U, a distally oriented container lower portion 12L, and a container wall 14 extending therebetween. The container wall 14 has an inner surface 14B, and an outer surface 14A. The blending container 12 further has a container interior space 16 which is defined between the inner surface 14B of the container wall 14, an upper opening 18U positioned at the container upper portion 12U which allows access to the container interior space 16, and a lower opening positioned at the container lower portion 12L. The blending container 12 also has a container lid 20, which detachably covers the container upper opening 18U. In a preferred embodiment, the blending container 12 has a cylindrical shape. Note that the blending container 12 may alternatively be formed in the shape of a rectangular or polygonal prism, while remaining in adherence to the principles of the present disclosure.

The pedestal portion 30 has a housing 30H, with a housing upper portion 32U, and a housing base 32B adapted to support the blender 10 upon a horizontal surface. The housing upper portion 32U has a container engagement point 38 which is adapted to receive the container lower portion 12L, allowing the blending container 12 to be removably fastened to the pedestal portion 30. The pedestal portion 30 also has a motorized blade assembly 54 which is positioned at the container engagement point 38 and projects upwardly into the container interior space 16 once the blending container 12 is attached to the pedestal portion 30. The blending container 12 is adapted to allow food pieces 80 to be inserted through the container opening 18U into the container interior space 16. The food pieces 80 come into contact with the blade assembly 34, which is adapted to rotate at high speed to reduce the food pieces 80 into smaller pieces, producing a blended food mixture.

The food scraping assembly 50 is adapted to address two common problems which interfere with the operation of the blender 10 and the production of the blended food mixture. As the food pieces 80 are reduced and blended by the blade assembly 34, cavitation may cause an air pocket 88 to form within the container interior space 16. The air pocket 88 surrounds the blade assembly 34 and acts as a barrier between the food pieces 80 and the blade assembly 34, causing the blade assembly 34 to spin within the air pocket 88 without contacting the food pieces 80. Furthermore, unblended food particles 82 may adhere to the inner surface 14B of the container wall 14 until they are manually dislodged, thus preventing the food particles 82 from being incorporated into the blended food mixture.

Figures 2A, 2B:
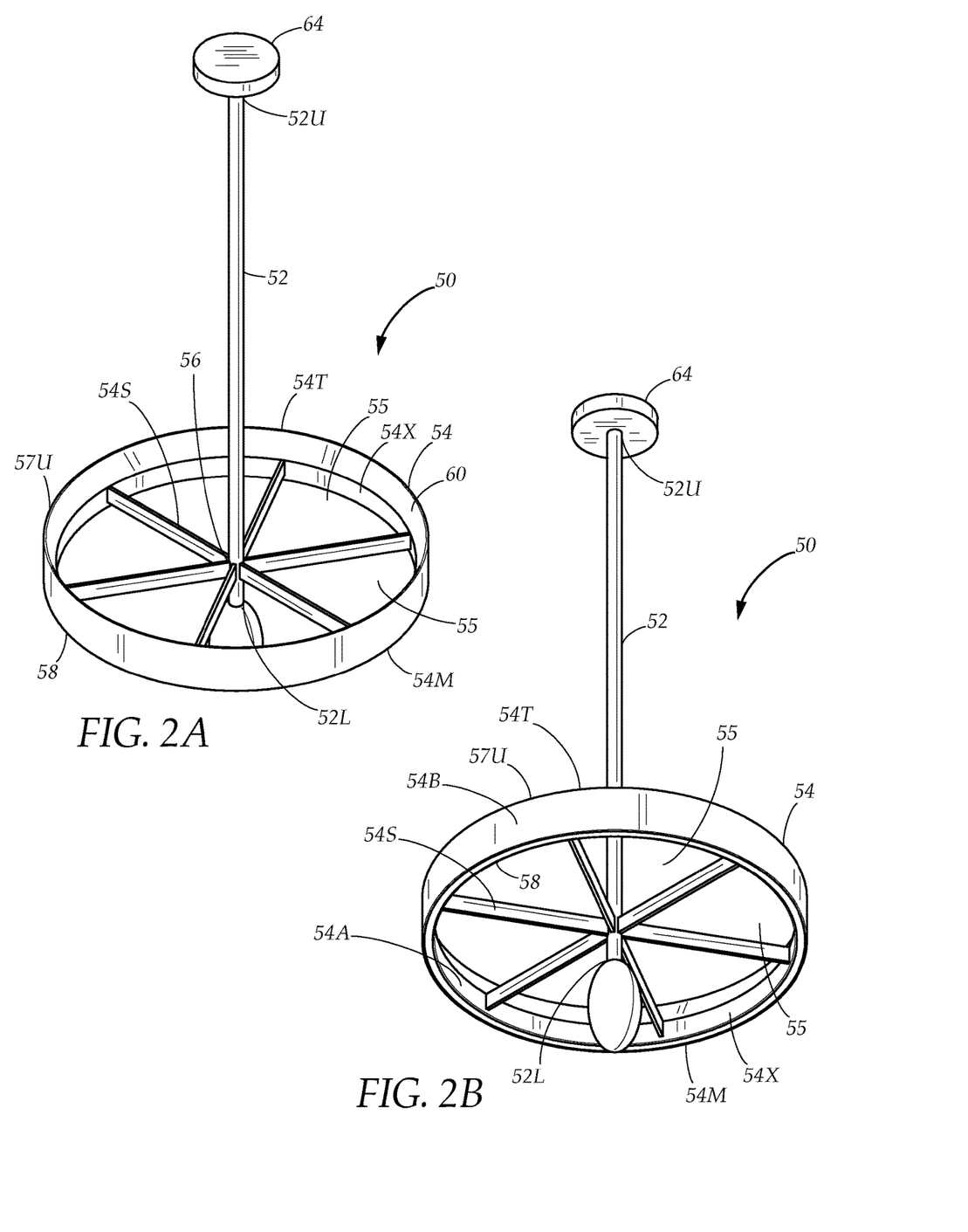
FIG. 2A is a diagrammatical perspective view of the food scraping assembly showing a rod which passes centrally through a scraping ring, in accordance with an embodiment in the present disclosure.
FIG. 2B is a diagrammatical perspective view of the food scraping assembly from below, showing an air pocket puncturing projection, in accordance with an embodiment in the present disclosure.
Figure 3:
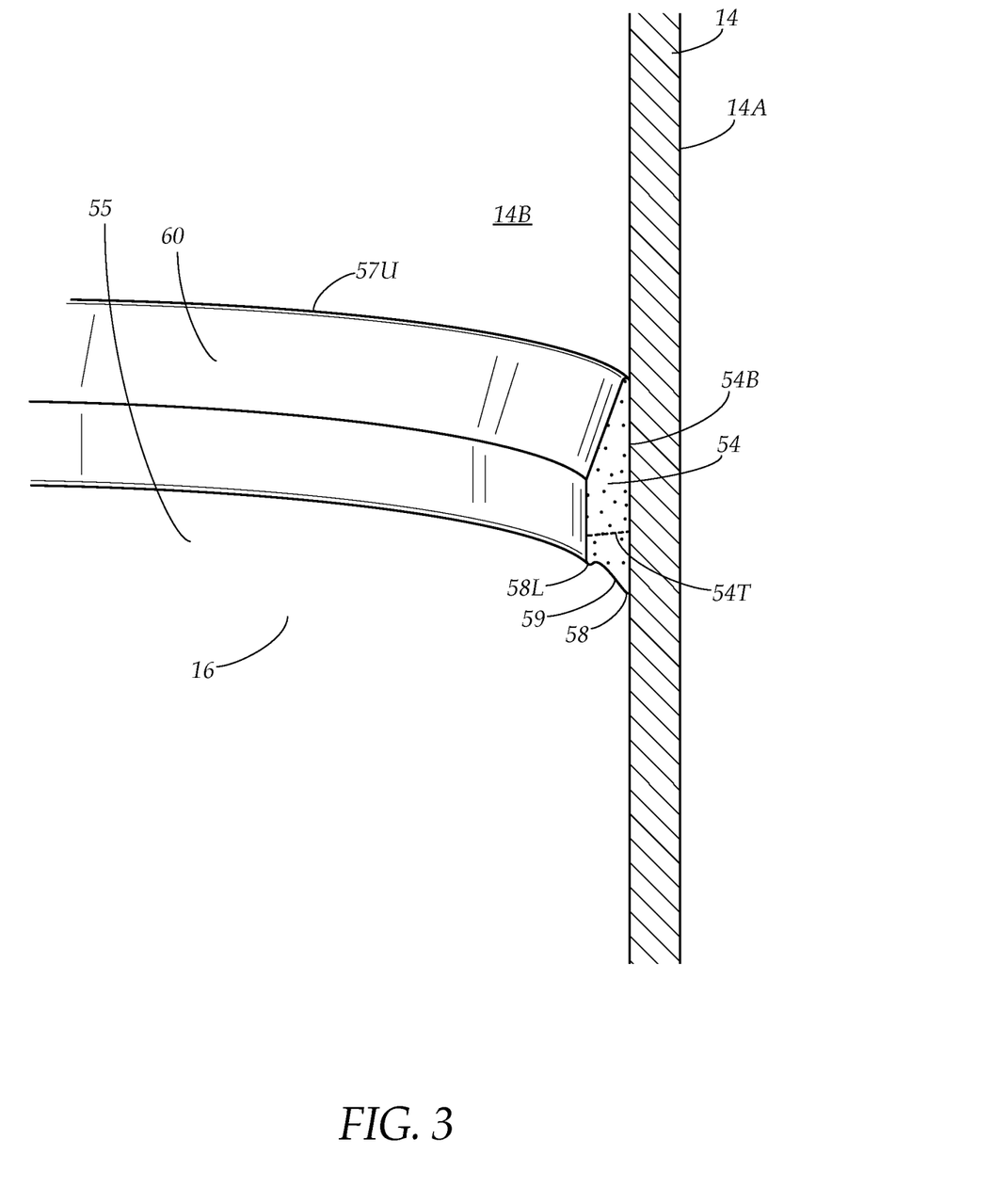
FIG. 3 is a diagrammatical cut away view showing the scraping ring abutting an inner surface of the blending container, showing an upward scraping edge, and a downward scraping edge, further showing a lip at the downward scraping edge, and a wedge-shaped upper inline which angles away from the upward scraping edge, in accordance with an embodiment in the present disclosure.

The food scraping assembly 50 is therefore adapted to dislodge the food particles 82 from the inner surface 14B so they may fall towards the container lower portion 12L and the blade assembly 34, as well as collapse the air pocket 88. Referring to FIGS. 2A-B while also referring to FIG. 1 and FIG. 4, in a preferred embodiment, the food scraping assembly 50 has a rod 52, a scraping ring 54, and an air pocket puncturing projection 66. The scraping ring 54 is adapted to match the shape of the cylindrical blending container 12, and may therefore be circular. In a preferred embodiment, the scraping ring 54 has a diameter 54D which matches the diameter 16D of the blending container 12. In other embodiments where the blending container 12 has a polygonal shape, the scraping ring 54 will be accordingly polygonal, thus ensuring that substantially the entire ring outer surface 54B remains in contact with the inner surface 14B of the container wall 14. Referring to FIGS. 3 and 4 while also referring to FIG. 1 and FIGS. 2A-B, the scraping ring 54 has a ring outer surface 54B, a ring inner surface 54A, and a ring thickness 54T which separates the ring outer and inner surfaces 54B, 54A. As seen in FIGS. 2A and 2B, the scraping ring 54 has a ring top 54T and a ring bottom 54M. The scraping ring 54 is substantially open between the ring top 54T and ring bottom 54M as defined by the ring inner surface 54A. The scraping ring 54 is positioned within the container interior space 16, and is oriented perpendicularly in relation to the container wall 14. The ring outer surface 54B is in continuous contact with the container wall inner surface 14B. The scraping ring 54 further has an upward scraping edge 57U at the ring top 54T facing towards the container upper portion 12U, and a downward scraping edge 58 facing towards the container lower portion 12L. In a preferred embodiment, the ring inner surface 54A is generally parallel to the ring outer surface 54B from near the ring bottom 54M in a vertical part 54X, but then tapers upwardly and outwardly toward the ring outer surface 54B towards the upward scraping edge 57U, forming a wedge-like upper incline 60 between the ring inner surface 54A and the upward scraping edge 57U.

Referring to FIG. 4 while also referring to FIG. 2B, the rod 52 has a rod upper end 52U and a distally oriented rod lower end 52L. The rod 52 passes centrally through the scraping ring 54, and is connected to the scraping ring 54 by a plurality of supports 54S which extend radially from the rod 52 to the scraping ring 54 to join the ring inner surface 54A to the rod 52 proximate to the rod lower end 52L. The scraping ring 54 has plurality of ring spaces 55 between the ring inner surface 54A and the supports 54S. The air pocket puncturing projection 66 extends downwardly away from the rod lower end 52L. In a preferred embodiment, the air pocket puncturing projection 66 has a tip 66E, and a width 66D which is substantially wider than the rod 52.

The rod 52 further has an end cap 64 positioned at the rod upper end 52U. The container lid 20 has a lid top surface 20U, a lid bottom surface 20L, and a container central opening 22 which extends therebetween. The rod 52 passes perpendicularly through the central opening 22 such that the container lid 20 is between the scraping ring 54 and the end cap 64. A return spring 62 may be positioned around the rod 52 between the lid upper surface 20U and the end cap 64.

Figure 5:
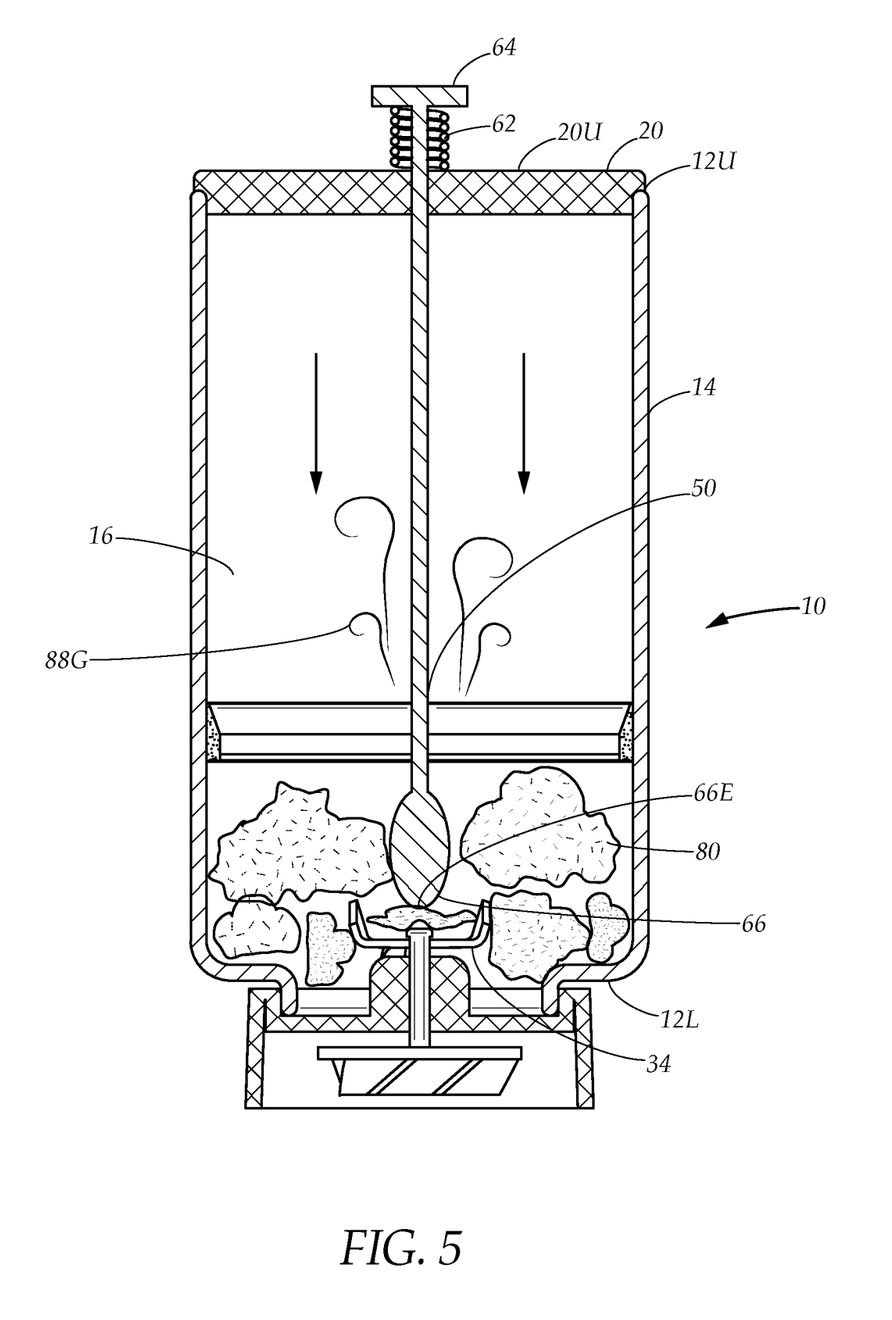
FIG. 5 is a diagrammatical cross section view of the blender, showing the food scraping assembly being pushed downwardly within the blending container so that the air pocket puncturing projection pierces and collapses the air pocket, in accordance with an embodiment in the present disclosure.

Continuing to refer to FIG. 4 while also referring to FIG. 3 and FIG. 5, the food scraping assembly 50 is ready to be used when the container lid 20 is secured to the container upper opening 18U. The central opening 22 of the container lid 20 allows the food scraping assembly 50 to be employed without requiring removal of the container lid 20. Furthermore, the food scraping assembly 50 may be employed even as the blade assembly 34 continues to spin. Pushing downwardly against the rod 52 causes the air pocket puncturing projection 66 and the scraping ring 54 to be lowered towards the container lower portion 12L and the blade assembly 34, while pulling the rod 52 upwardly causes the air pocket puncturing projection 66 and the scraping ring 54 to be raised towards the container lid 20. The end cap 64 may be in the shape of a knob, disc, or other object which allows a user to more easily push downwardly against the rod 52. In a preferred embodiment, the return spring 62 is adapted to compress between the end cap 64 and the lid top surface 20U when the rod 52 is pushed downwardly by the user. Once the user ceases to push downwardly against the end cap 64, the return spring is adapted to decompress and cause the food scraping assembly 50 to raise by pushing upwardly against the end cap 64. In other embodiments, the food scraping assembly 50 may be raised manually by the user without the use of the return spring 62.

Figure 7:
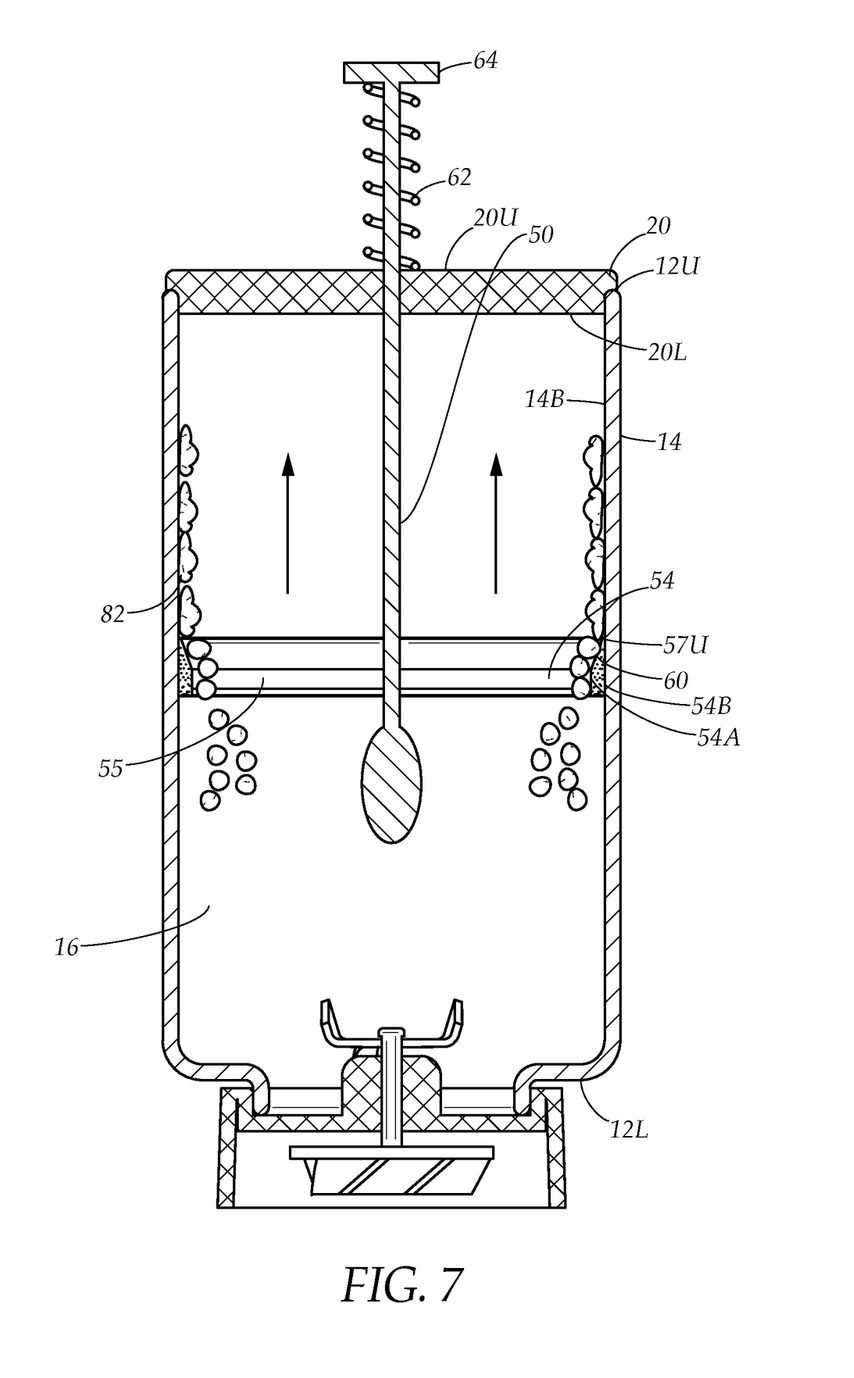
FIG. 7 is a diagrammatical cross section view of the blender, showing unblended food particles accumulating along the inner surface of the blending container above the scraping ring, further showing the food scraping assembly being pushed upwardly to allow the upward scraping edge to dislodge the unblended food particles from the inner surface, in accordance with an embodiment in the present disclosure.
Figure 8:
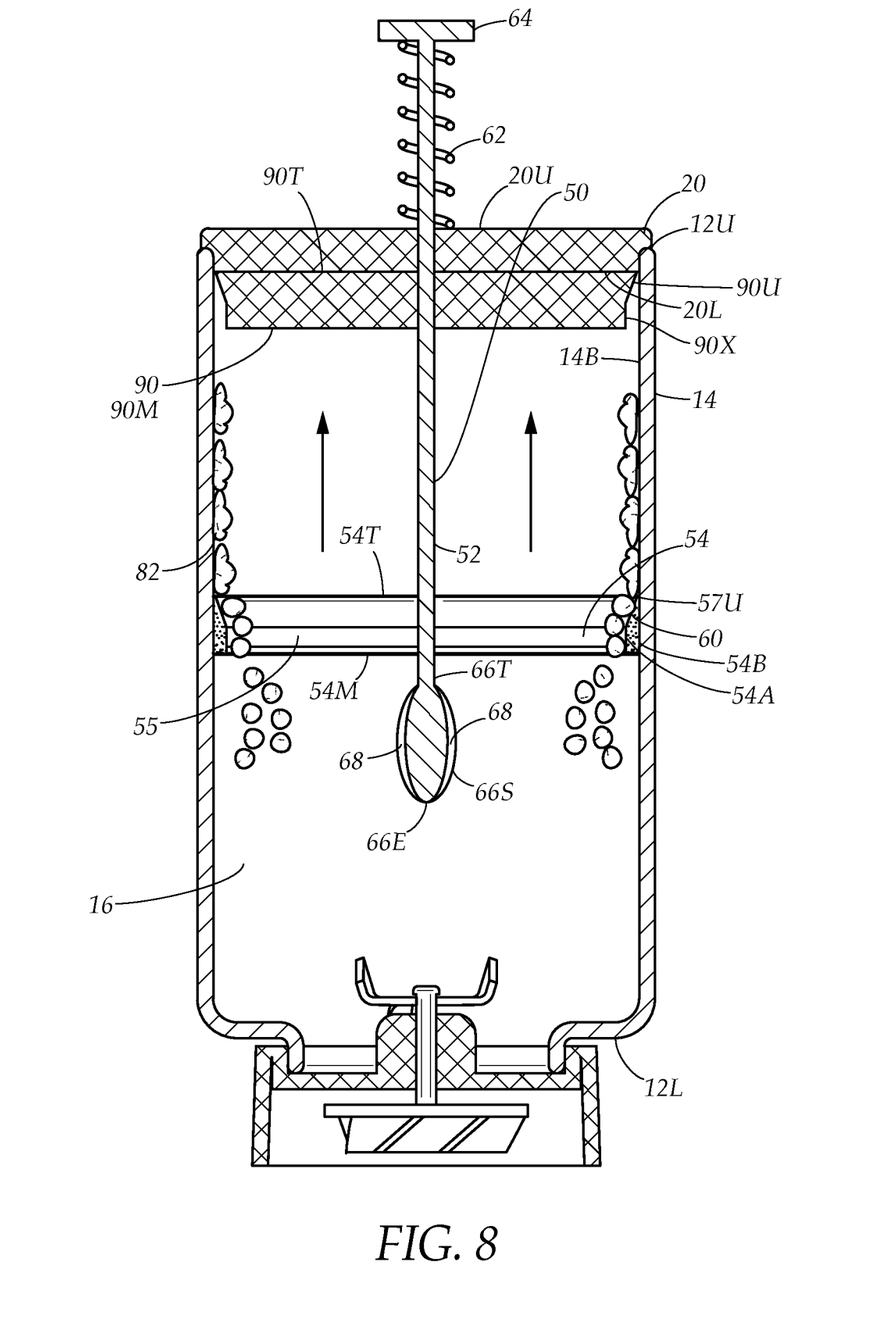
FIG. 8 is a diagrammatic cross section view of the blender, similar to FIG. 7, except showing an embodiment where the lid has a cleaning extension and the air pocket puncturing projection has vertically extending vent channels extending into the surface thereof.

Pushing the food scraping assembly 50 downwardly causes the tip 66E of the air pocket puncturing projection 66 to pierce the air pocket 88 and release the air 88G contained therein, thus collapsing the air pocket 88 and allowing the operation of the blender 10 to resume. The width 66D of the puncturing projection 66 is sufficient to ensure that the air pocket 88 collapses, whereas a narrow puncture would leave the air pocket 88 intact. In one embodiment, the air pocket puncturing projection 66 may be ovoid in shape. However, the air pocket puncturing projection 66 may be formed using a variety of alternative shapes, each having sufficient width to create a puncture large enough to collapse the air pocket 88. Furthermore, in a preferred embodiment, the return spring 62 prevents the air pocket puncturing projection 66 from contacting the blade assembly 34. Once the return spring 62 is fully compressed, the end cap 64 is prevented from further approaching the lid top surface 20U. In other embodiments, the rod 52 may have a reduced length which prevents the air pocket puncturing projection 66 from contacting the blade assembly 34. Referring to FIG. 7, in a preferred embodiment, the food scraping assembly 50 may be raised upwardly until the scraping ring 54 contacts the lid bottom surface 20L, thus allowing the scraping ring 54 to dislodge substantially all accumulations of food particles 82 between the lid bottom surface 20L and the blade assembly 34. Referring to FIG. 8, the air pocket projection 66 has a top 66T where it adjoins the rod 52, and an outer surface 66S. In the embodiment shown, the air pocket projection has radially arranged vent channels 68 that extend between the top 66T and the tip 66E. Such vent channels 68 help to vent air from the air pocket 88 (see FIG. 4) to above the air pocket projection 66. The vent channels 68 may be grooves extending on the outer surface 66S of the air pocket projection 66. The vent channels are generally vertical and radially arranged. For example in FIG. 8, two grooves are visible that are 180 degrees apart, but in this embodiment actually four grooves are present that are 90 degrees apart. Any suitable number of grooves may be employed to accomplish the desired venting.

Referring now to FIGS. 6 and 7 and 8 while also referring to FIG. 3, pushing the food scraping assembly downwardly towards the container lower portion 12L allows the downward scraping edge 58 of the scraping ring 54 to remove any food particles 82 which have adhered to the inner surface 14B of the container wall 14 between the scraping ring 54 and the container lower portion 12L. Similarly, pushing the scraping ring 54 upwardly towards the container upper portion 12U allows the upward scraping edge 57U to remove any food particles 82 which have adhered to the inner surface 14B between the scraping ring 54 and the container upper portion 12U. The wedge-like shape of the upper scraping edge 57U and the upper incline 60 allows the food particles 82 to be separated from the inner surface 14B of the container wall 14, further causing the food particles 82 to slide downwardly over the upper incline 60 to fall through the ring spaces 55 towards the container lower portion 12L.

In order to prevent the removed food particles 82 from accumulating on the scraping ring 54 as the food scraping assembly 50 is pushed downwardly, the scraping ring 54 may have a lip 58L which is circumferentially positioned between the downward scraping edge 58 and the ring inner surface 54A to transition in diameter or thickness from the vertical part of the ring inner surface 54A to the ring outer surface 54B. The lip 58L has a lip concavity 59 which catches the food particles 82 as they are dislodged by the downward scraping edge 58, and causes the dislodged food particles 82 to fall downwards towards the container lower portion 12L.

In the embodiment shown in FIG. 8, the lid has a cleaning extension 90 that extends beyond the lid lower surface 20L. The cleaning extension 90 has a cleaning extension top 90T and a cleaning extension bottom 90M that is substantially the same as a distance between the ring top 54T and ring bottom 54M. The cleaning extension has an upper part 90U that tapers inwardly from the cleaning extension top 90T, away from the inner surface 14B of the container wall 14, and a vertical part 90X that extends substantially vertically (with uniform inner diameter) from the upper part 90U to the cleaning extension bottom 90M. The cleaning extension 90 is thereby configured to fit within ring inner surface 54A to free excess material therefrom. Grooves may be provided as appropriate into the cleaning extension bottom 90M to accommodate the supports 54S (seen in FIG. 2A) to allow the cleaning extension bottom to travel fully upwardly such that the top 54T of the scraping ring 54 substantially meets the top 90T of the cleaning extension 90.

Note that the principles within the present disclosure may be applied to other types of kitchen appliances which are similar to blenders. For example, the food scraping assembly 50 may be modified to function with food processors and juicers. Furthermore, the principles within the present disclosure are also applicable to blenders used in laboratories for the preparation of mixtures unrelated to food.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a blender with an integrated food scraping assembly. The disclosure is illustrated by example in the drawing figures, and throughout the written description. It should be understood that numerous variations are possible, while adhering to the inventive concept. Such variations are contemplated as being a part of the present disclosure.

What is claimed is:

1. A blender, comprising:
   a blending container having a container upper portion having an upper opening, a distally oriented container lower portion having a lower opening, and a container wall extending between the container upper portion and container lower portion, the container wall has an inner surface and an outer surface, the container wall defines a container interior space between the inner surface, the upper opening, and the lower opening that is adapted for containing food particles;
   a blade assembly that projects upwardly into the container interior space from the lower opening;
   a container lid, which detachably mates with and covers the container upper opening, the container lid having a lid lower surface and a central opening;
   a food scraping assembly having a scraping ring having a ring top, a ring bottom, a ring outer surface engaged with the inner surface of the container wall and a ring inner surface that is substantially open between the ring top and ring bottom, the ring inner surface has an upward scraping edge at the ring top facing towards the container upper portion, and a downward scraping edge facing towards the container lower portion, the ring inner surface has a vertical part that is generally parallel to the ring outer surface near the ring bottom, and a wedge-like upper incline that tapers upwardly and outwardly toward the ring outer surface from the vertical part towards the upward scraping edge, the scraping ring further having a lip which is circumferentially positioned between the downward scraping edge and the vertical part to transition in diameter from the vertical part of the scraping ring to the ring outer surface, the lip has a lip concavity adapted for catching food particles as they are dislodged from the inner surface of the container wall by the downward scraping edge so that such food particles can fall downwardly towards the container lower portion, the food scraping assembly also having a rod extending through the central opening of the container lid, having an upper end and a distally oriented rod lower end, the food scraping assembly further having a plurality of supports that connect the rod to the scraping ring proximate the rod lower end, and an air pocket puncturing projection attached at the rod lower end, the rod selectively moving the scraping ring vertically while remaining engaged with the inner surface of the container wall.

2. The blender as recited in claim 1, further comprising a return spring engaged with the rod, for biasing the scraping ring toward the container lid.

3. The blender as recited in claim 2, wherein the rod has an end cap located at the upper end, the lid has a top surface, and wherein the return spring is located between the top surface of the lid and the end cap.

4. The blender as recited in claim 3, wherein the lid has a cleaning extension that extends beyond the lid lower surface, the cleaning extension has a cleaning extension top and a cleaning extension bottom that is substantially the same distance apart as a distance between the ring top and ring bottom, the cleaning extension has an upper part that tapers inwardly from the cleaning extension top, away from the inner surface of the container wall, and a vertical part that extends substantially vertically from the upper part of the cleaning extension to the cleaning extension, The cleaning extension 90 is thereby configured to fit within ring inner surface when the scraping ring is fully upwardly against the lid lower surface.

5. The blender as recited in claim 4, wherein the air pocket puncturing projection has a top where it adjoins the rod, a tip opposite the top, and an outer surface, a plurality of vent channels extend into the outer surface from the top to the tip, the vent channels are adapted help to vent air from an air bubble that may form within the food particles to above the air pocket projection.

6. A blender, comprising:
a blending container having a container upper portion having an upper opening, a distally oriented container lower portion having a lower opening, and a container wall extending between the container upper portion and container lower portion, the container wall has an inner surface and an outer surface, the container wall defines a container interior space between the inner surface, the upper opening, and the lower opening that is adapted for containing food particles;
a blade assembly that is projects upwardly into the container interior space from the lower opening;
a container lid, which detachably mates with and covers the container upper opening, the container lid having a top surface, a lid lower surface and a central opening;
a food scraping assembly having a scraping ring having a ring top, a ring bottom, a ring outer surface engaged with the inner surface of the container wall and an ring inner surface that is substantially open between the ring top and ring bottom, the food scraping assembly also having a rod extending through the central opening of the container lid, wherein the ring inner surface has an upward scraping edge at the ring top facing towards the container upper portion, and a downward scraping edge facing towards the container lower portion, the ring inner surface has a vertical part that is generally parallel to the ring outer surface near the ring bottom, and a wedge-like upper incline that tapers upwardly and outwardly toward the ring outer surface from the vertical part towards the upward scraping edge, the scraping assembly also having an upper end and a distally oriented rod lower end, the food scraping assembly further having a plurality of radially extending supports that connect the rod to the to the scraping ring proximate the rod lower end, the rod having an end cap located at the upper end, the rod selectively moving the scraping ring vertically while remaining engaged with the inner surface of the container wall, the scraping assembly further comprises a return spring engaged with the rod, for biasing the scraping ring toward the container lid, the return spring is located between the top surface of the lid and the end cap, and
wherein the lid further comprises a cleaning extension that extends beyond the lid lower surface, the cleaning extension has a cleaning extension top and a cleaning extension bottom that is substantially the same distance apart as a distance between the ring top and ring bottom, the cleaning extension has an upper part that tapers inwardly from the cleaning extension top, away from the inner surface of the container wall, and a vertical part that extends substantially vertically from the upper part of the cleaning extension to the cleaning extension, the cleaning extension is thereby configured to fit within the ring inner surface when the scraping ring is fully upwardly against the lid lower surface.

7. The blender as recited in claim 6, wherein the scraping assembly further comprises an air pocket puncturing projection attached at the rod lower end, the air pocket puncturing projection has a top where it adjoins the rod, a tip opposite the top, and an outer surface, a plurality of vent channels extend into the outer surface from the top to the tip, the vent channels are adapted help to vent air from an air bubble that may form within the food particles to above the air pocket projection.

8. The blender as recited in claim 6, wherein the scraping ring has a lip which is circumferentially positioned between the downward scraping edge and the vertical part to transition in diameter from the vertical part of the scraping ring to the ring outer surface, the lip has a lip concavity adapted for catching food particles as they are dislodged from the inner surface of the container wall by the downward scraping edge so that such food particles can fall downwardly towards the container lower portion.

\* \* \* \* \*